Feb. 27, 1962 C. W. REASER 3,022,833
SOD PLUG CUTTING MACHINE
Filed April 27, 1959 2 Sheets-Sheet 1

INVENTOR.
Clinton W. Reaser.
BY
Fishburn and Gold
ATTORNEYS.

Feb. 27, 1962    C. W. REASER    3,022,833
SOD PLUG CUTTING MACHINE
Filed April 27, 1959    2 Sheets-Sheet 2
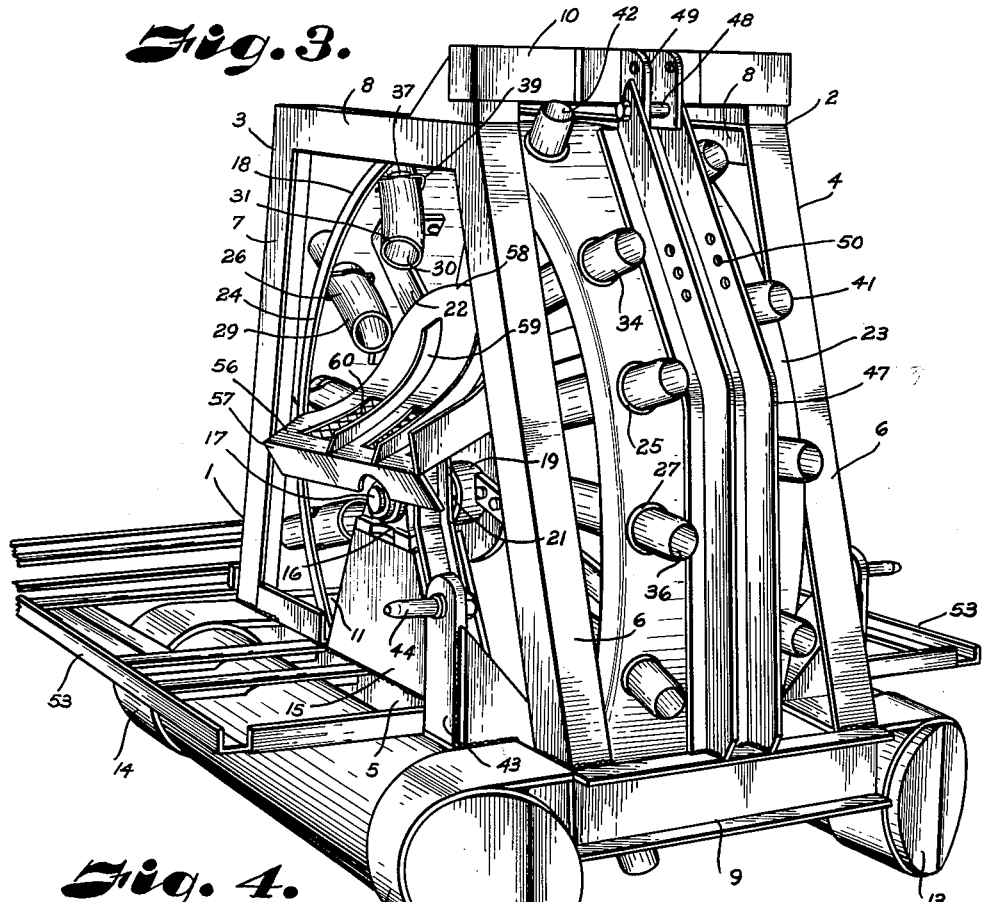
INVENTOR.
Clinton W. Reaser.
BY
Fishburn and Gold
ATTORNEYS.

United States Patent Office 3,022,833
Patented Feb. 27, 1962

3,022,833
SOD PLUG CUTTING MACHINE
Clinton W. Reaser, 325 E. 27th St., Topeka, Kans.
Filed Apr. 27, 1959, Ser. No. 809,069
2 Claims. (Cl. 172—19)

This invention relates to a sod plug cutting machine, and more particularly to a machine adapted to be moved over sod and cut and remove plugs of sod from the ground and to dig spaced sod plug holes in a lawn to be treated.

The principal objects of the present invention are to provide a machine adapted to be drawn over the ground and having a wheel-like drum with spaced tubular digging elements extending radially from the periphery thereof which are forced into the ground during rotation of the drum-like member to dig sod plugs to be transplanted or to dig sod plug holes in a lawn to be treated; to provide such a machine with a frame suspended on the axles of the drum-like member and carrying weights whereby the machine has sufficient weight to force the tubular digging elements into the ground; to provide such a machine wherein the tubular digging elements have sharpened edges at the outer ends and a tapered bore increasing in diameter from said sharpened edges; to provide such a machine wherein the bores of the cutting elements communicate with plug-directing passages for gravitational movement of the plugs therethrough for discharge laterally of the drum-like member; to provide such a machine with racks carried by the frame at each side of the drum-like member for supporting cartons for receiving the cut plugs and a downwardly and outwardly curved chute for receiving the cut plugs from the plug passages and directing same into the boxes; to provide such a machine with removable digging elements to facilitate replacement; to provide such a machine with draft connections whereby it may be drawn by a tractor or the like over the ground; and to provide such a sod plug cutting machine that is of simple, durable construction and efficient in operation to dig and take from the ground a different sod plug for each digging element during each cycle of rotation of the drum-like member and effect a release of the plug from the digging element by the next succeeding plug cut thereby.

Other objects and advantages of this invention will become apparent from the following description taken in connection with the accompanying drawings, wherein are set forth by way of illustration and example certain embodiments of this invention.

FIG. 3 is a perspective view of the sod cutting machine looking from the front at one side thereof.

FIG. 4 is a fragmentary sectional view through the drum-like member and digging element and sod passage.

FIG. 5 is a transverse sectional view through the digging element and passage on the line 5—5, FIG. 4, particularly illustrating the keeper for retaining the digger element in assembled position.

FIG. 6 is a sectional view through the digging element on the line 6—6, FIG. 4.

Figure 1:
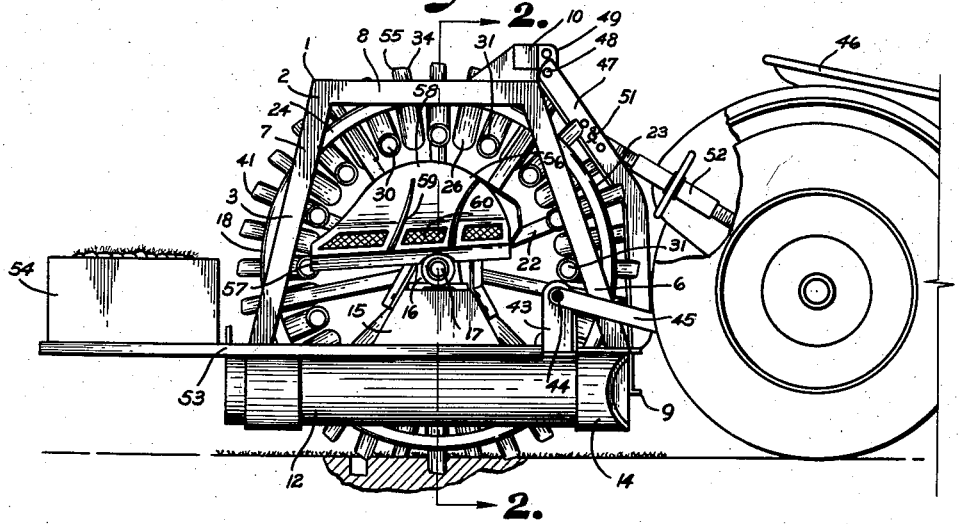
FIG. 1 is a side elevation of the rear portion of a tractor having connected thereto a sod plug cutting machine embodying the features of the present invention.

Referring more in detail to the drawings:

1 designates a sod plug cutting machine which includes a frame 2 having laterally spaced frame panels 3 and 4 preferably formed of structural members such as angle iron and channels with each of the frame panels having longitudinally extending lower members 5 and upwardly inclined front and rear members 6 and 7 suitably secured as by welding to the lower members at the ends thereof with the upper ends of said front and rear members 6 and 7 connected by a longitudinally extending top member 8. The frame panels 3 and 4 are connected at their forward lower ends by a transverse member 9 and at their forward upper ends by a transverse member 10, and at their rear lower ends by a transverse member 11. Weight members 12 and 13 are arranged longitudinally of the frame at the outside of the lower members 5 and are secured thereto by supports such as strap hangers 14 to form a rigid frame structure with substantial weight. Standards 15 are mounted on each of the bottom members 5 of the respective frame panels substantially midway between the front and rear members 6 and 7 and have bearings 16 mounted on the upper portion thereof to rotatably mount a transverse shaft 17 which serves as the axle of a drum-like wheel member 18 arranged between the frame panels 3 and 4. The drum-like member 18 has a hub 19 fixed on the shaft 17 by suitable fastening devices such as setscrews 20 and is equally spaced from the bearing members 16. Spacers 21 are preferably sleeved on the shaft 17 between the hub 19 and the respective bearing members 16 to prevent lateral movement of the drum-like member relative to the frame panels. A plurality of spoke-like members 22 extend from the hub member 19 and are secured to the peripheral wall or rim 23 of the drum-like member. The side edges of the peripheral wall are preferably turned inwardly to form flanges 24 to add to the rigidity of said wall.

Figure 2:
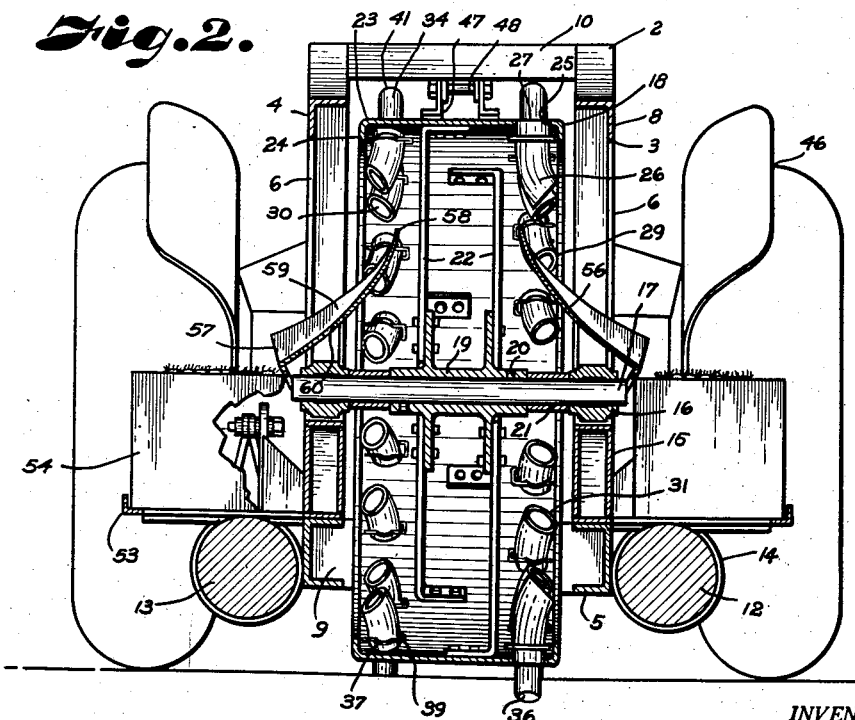
FIG. 2 is a transverse sectional view through the sod cutting machine on the line 2—2, FIG. 1.

The peripheral wall or rim 23 has a plurality of circumferentially spaced openings 25 arranged adjacent each side thereof with the openings at one side of the drum-like member in staggered relation to the openings adjacent the other side. A tubular member 26 is secured to the drum-like member for each of the openings 25, said tubular member 26 having one end 27 positioned in the respective opening 25 and secured to the peripheral wall 23 by welding or the like as at 28. The tubular member 26 extends inwardly substantially radially with the inner portion curved laterally outwardly as at 29, as illustrated in FIG. 4, the curvature of said inner portion preferably being such that the passage or bore 30 at the end 31 is directed laterally at approximately 20 degrees to the radial passage portion 32 adjacent the peripheral wall 23 of the drum. The bore or passage in the member 26 is preferably larger than the plugs of sod to be cut, and the end portion of each member 26 is counterbored as at 33 of a suitable size to receive the inner end of a tubular digging element 34 with the inner end of said tubular digging element 34 engaging a shoulder 35, the bore 36 of the tubular digging element 34 preferably being the same size as the bore or passage in the member 26. The member 26 and the tubular digging element have registering slots 37 and 38 whereby a keeper pin 39 is applied thereto with the legs 40 of said keeper pin engaging the members to retain the digging element in assembled position. The outer end portions of the digging elements 34 are preferably swedged or tapered inwardly, and the outer edge 41 sharpened to provide an edge that will cut into the sod. The inward swedging provides a tapered portion 42 adjacent the outer cutting edge 41 whereby the diameter at the cutting edge is less than the diameter of the bore 36, as illustrated in FIGS. 4 and 6, whereby a plug of sod cut by the digging elements is smaller than the bore 36 and passage 30 for movement of the plug therethrough, as later described. It is preferable that the digging elements extend radially outwardly from the peripheral wall 23 of the drum-like member a distance substantially corresponding to the desired depth of penetration and thickness of the plug to be cut. Also, the drum-like member with the projecting digging elements thereon is of such size that it can rotate in the bearings 16 and the ends of the digging elements pass the transverse frame members 9, 10 and 11 with suitable clearance, the lower periphery of the drum-like member extending downwardly below the bottom frame members 5 and weights 12 and 13 as illustrated in FIG. 2.

The frame 2 has upstanding brackets 43 at each side adjacent the front member 6 with laterally extending pins 44 to pivotally mount draft bars 45 the forward ends of which are suitably connected to a tractor 46. The frame also has spaced members 47 extending upwardly from the transverse member 9 and connected at their upper ends by a pin 48 to flanges 49 on the transverse member 10, the members 47 preferably being between the path of travel of the digging elements 34 at each side of the drum-like member, as illustrated in FIG. 3. The members 47 have aligned openings 50 for receiving a pin 51 to pivotally connect an adjustable draft member 52 having its other end suitably connected to the tractor 46 whereby adjustment of the length of the member 52 cooperates with the bars 45 to tilt the frame 2 and position the bottom of the members 5 and weights 12 and 13 substantially parallel with the ground as the machine is drawn thereover. Racks 53 are mounted on the frame 2 at the side and rear thereof to support cartons 54 for receiving sod plugs, the racks at the sides of the frame being arranged to hold such cartons for receiving the plugs from the members 26, as later described.

As the machine is drawn by a tractor or the like over ground from which plugs are to be cut, the weight of the machine forces the digging elements 34 into the ground, the cutting edge preferably being bevelled whereby the end 55 thereof enters first, the digging element cutting a circular plug of sod having a diameter corresponding to the diameter of the digging element at the cutting edge 41. As the drum-like member rotates during forward movement of the machine, the plug is removed from the ground and carried upwardly with the digging element and the plug held therein by the engagement of the plug with the digging element adjacent the cutting edge. When the drum-like member has completed a cycle in its rotation, the digging elements with the plugs therein are again forced into the ground to cut a second plug, said second plug forcing the first plug in the digging element inwardly into the larger portion of the bore 36. Then, as the drum-like member continues to rotate, and the respective digging element moves above the horizontal, the first plug cut by the respective digging element will tend to be moved by gravity through the passage 30 and be discharged laterally from the open end 31 of the member 26. The plug is discharged onto a downwardly and outwardly curved chute 56 having its outer and lower end 57 positioned above the carton at the sides of the frame whereby the sod plug will move downwardly and outwardly on the chute to the carton. The chute is preferably slightly inclined forwardly and upwardly and also is curved inwardly and upwardly from the edge 57 whereby the upper edge 58 extends inside of the drum-like member inwardly of and below the ends 31 of the passage members 26 whereby all sod plugs are discharged onto said chutes. The forward movement of the upper portion of the drum-like member tends to give a forward movement to the sod plugs as they are discharged and, therefore, a plurality of deflectors 59 are arranged in spaced relation and extend from adjacent the upper edge 58 of the chutes to the lower edge 57 to deflect the plugs into the carton. Also, the chutes have a perforated portion 60 forming a screen whereby loose particles of dirt separating from the plugs will fall through the screen and drop to the ground and not be directed into the cartons. With this arrangement, the machine, in response to being drawn over sod to be cut, cuts the plugs, removes them from the ground, and then discharges the plugs over the screens and into the cartons, and when one carton is filled it can be moved to the rear portion of the rack (FIG. 1) and an empty carton positioned at the sides of the machine adjacent the ends of the chutes 56 to be filled with plugs. The machine can also be used on a lawn to be treated to take plugs from said lawn whereby suitably spaced sod plug holes are formed and the previously dug plugs of desired grass are then placed in the holes of the lawn to be treated.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A machine for cutting sod plugs comprising, a wheel having a rim, a plurality of circumferentially spaced circular apertures in the wheel rim, a tubular member fixed on the wheel rim at each circular aperture and extending radially inwardly therefrom and terminating in an inner portion turned outwardly relative to a side of said wheel, said tubular members each having a through bore with a counterbore extending therein from the wheel rim and in registry with the respective circular aperture, a plurality of tubular digger elements open at each end thereof, said digger elements each having one end portion sleeved in a respective counterbore with the other end of each of said digger elements extending radially and outwardly from said wheel rim, and means removably engaging said tubular member and the respective digger element for securing the digger element to the tubular member, said tubular digger elements each having a bore with a tapered portion adjacent the outer end thereof and terminating in a cutting edge for cutting a cylindrical plug of smaller diameter than the bore in the cutting element and the tubular member remote from said cutting edge whereby plugs are cut and retained in the tapered portion of the bore and subsequent plugs cut by the respective digger element force the first cut plug into the bore remote from the tapered portion for gravitational movement from the open end of the outwardly turned portion of the respective tubular member upon inversion thereof.

2. A machine for cutting sod plugs comprising, a frame having laterally spaced side portions, an axle extending transversely of the frame, bearing means mounting said axle to said frame in a horizontal position for rotation with respect thereto, a wheel mounted on the axle between said frame side portions and having a ground-engaging rim, a plurality of circumferentially spaced circular apertures in the wheel rim, a plurality of tubular digger elements having each end open, means mounting the digger elements one in each of said apertures of said wheel rim with said digger elements extending radially therefrom, said tubular digger elements each having a bore with a tapered portion adjacent the outer end thereof and terminating in a cutting edge for cutting a cylindrical plug of smaller diameter than the bore remote from said cutting edge, racks on said frame side members and extending laterally outwardly therefrom for supporting plug-receiving containers, a guide member mounted in the wheel for each of the respective digger elements and having a passage communicating with the end of said respective digger element remote from the tapered portion thereof, said passage in the guide member being as large as the bore in the respective digger element for movement of plugs therethrough, said guide members each having an inner end turned outwardly relative to a side of the wheel whereby movement of the frame relative to the ground effects rolling movement of the wheel and the cutting edge of each digger element enters the ground and cuts a cylindrical plug of smaller diameter than the bore remote from said cutting edge and the cut plugs are retained in the tapered portion of the bore and subsequent plugs cut by the respective digger element force the first cut plug into the bore remote from the tapered portion for gravitational movement therefrom through the passage of the respective guide member upon inversion thereof for directing said plug outwardly relative to the side of the wheel, and a chute mounted on the frame side members inwardly of the guide members and adjacent said inner ends thereof when inverted, said chute being curved downwardly and outwardly and terminating above containers positioned on the racks whereby the chutes receive the discharged sod plugs and direct them into containers on the racks, said chute having a perforated portion intermediate its length defining a screen through which fine dirt will pass as the sod plugs move thereover to the containers.

References Cited in the file of this patent

UNITED STATES PATENTS

| | | |
|---|---|---|
| 862,773 | Wahlund | Aug. 6, 1907 |
| 913,350 | Baylis | Feb. 23, 1909 |
| 1,287,648 | Currie | Dec. 17, 1918 |
| 2,700,926 | Goit | Feb. 1, 1955 |
| 2,768,570 | Strid | Oct. 30, 1956 |
| 2,881,844 | Miller | Apr. 14, 1959 |

FOREIGN PATENTS

| | | |
|---|---|---|
| 609,503 | Germany | Feb. 16, 1935 |
| 441,434 | Great Britain | Jan. 20, 1936 |